ered, insoluble polyphenylene oxide
United States Patent

Factor

[15] 3,644,227
[45] Feb. 22, 1972

[54] SEPARATION OF POLY(2,6-DIMETHYL-1,4-PHENYLENE OXIDE) FROM ITS BLENDS WITH OTHER POLYMERS

[72] Inventor: Arnold Factor, Scotia, N.Y.
[73] Assignee: General Electric Company
[22] Filed: July 7, 1969
[21] Appl. No.: 839,690

[52] U.S. Cl..........................260/2.3, 260/33.6, 260/33.8, 260/47, 260/823, 260/824, 260/874, 260/876, 260/887, 260/901
[51] Int. Cl.........................................C08g 53/22
[58] Field of Search..................................260/2.3

[56] References Cited

OTHER PUBLICATIONS

Factor et al., " Polymer Letters," Vol. 7 (1969), pp. 205–209.

Primary Examiner—Samuel H. Blech
Attorney—James W. Underwood, Richard R. Brainard, Paul A. Frank, Joseph T. Cohen, Frank L. Neuhauser, Oscar B. Waddell and Joseph B. Forman

[57] ABSTRACT

Poly(2,6-dimethyl-1,4-phenylene oxide) can be separated from a blend of this polymer with any other polymer which is soluble in dichloromethane, dibromomethane or bromochloromethane. Initially, the entire blend is soluble in these solvents, but on standing the polyphenylene oxide precipitates and can be separated from the balance of the solution. Exposing the polymer blend to vapors of these solvents, also causes the polyphenylene oxide to become insoluble, so that the polymer or polymers with which it is blended can be extracted away from the insoluble polyphenylene oxide by use of these solvents. The separated, insoluble polyphenylene oxide can be rendered soluble by vacuum treatment, evaporation of the contained solvent, washing with a polyphenylene oxide nonsolvent, etc. Therefore, this technique is useful for recovering or separating this polyphenylene oxide in a useable form from such blends.

6 Claims, No Drawings

SEPARATION OF POLY(2,6-DIMETHYL-1,4-PHENYLENE OXIDE) FROM ITS BLENDS WITH OTHER POLYMERS

This invention relates to a process of separating poly(2,6-dimethyl-1,4-phenylene oxide) from blends of this polymer with other polymers which are soluble in dichloromethane, dibromomethane or chlorobromomethane.

Polyphenylene oxides, also known as polyphenylene ethers, are an extremely interesting group of new polymers. These polymers and the process of producing them are disclosed in Hay patents, U.S. Pat. Nos. 3,306,874 and 3,306,875. As a general class, 2,6-disubstituted phenols produce the highest molecular weight polyphenylene oxides since they block the two and six positions causing the oxidative coupling reaction to occur between the para position of one phenol molecule and the oxygen on the hydroxyl group of another phenol molecule, thereby, producing poly(1,4-phenylene oxides). Of the 2,6-disubstituted phenols, 2,6-dimethylphenol is the most readily available and therefore the commercial product now on the market is poly(2,6-dimethyl-1,4-phenylene oxide).

This polymer has many interesting properties which has caused it to be used for the production of a wide variety of molded products. One of its outstanding properties is its flow temperature so that it can be used in the production of molded objects which must be capable of withstanding higher temperature than other readily available thermoplastic materials. Another outstanding property of this polymer is its high impact strength. For applications where only the high impact strength is required, it is possible to use blends of the poly(2,6-dimethyl-1,4-phenylene oxide) with other thermoplastic polymers. These blends produce molded compositions which have outstanding properties in their own right. Such blends are disclosed and claimed in Fox, U.S. Pat. Nos. 3,221,080 and 3,356,761, Gowan, U.S. Pat. No. 3,361,851 and Cizek, U.S. Pat. No. 3,383,435.

In addition to the blends disclosed and claimed in these patents, the polyphenylene oxides are capable of being blended with a wide variety of other thermoplastic polymers. For example, polybutadiene and its various random, block and graft copolymers, the polymers of acrylate and α-substituted acrylate esters, etc. In many of these blends, the polyphenylene oxide and the other polymer are completely miscible and form a homogeneous blend while in other cases, complete miscibility is not attained and the blends are heterogeneous mixtures.

In making molded objects from these polymer blends, scrap material is accumulated from the flash and sprues from which it would be highly desirable to recover the contained polyphenylene oxide in reuseable form. I have now discovered that the homopolymer, poly(2,6-dimethyl-1,4-phenylene oxide) has the very unique property that it can be dissolved in dichloromethane, dibromomethane, bromochloromethane, or mixtures thereof, but will precipitate on standing due apparently to the formation of an insoluble complex with some of the solvent. The precipitated polymer retains its solubility in other solvents in which it was soluble and can be rendered soluble in these three solvents by removal of the complexed solvent, e.g., by evaporation. This unique property of this polymer permits it to be readily separated from its blends from other polymers even though the polymers with which it is blended are soluble in these three solvents. It is readily recognized that no problem would exist if the other polymer were insoluble. In so far as I am aware, this unique property is not possessed by any other polymer either the polymers which are blended with the poly(2,6-dimethyl-1,4-phenylene oxide) or by the latter if its solubility characteristics have been sufficiently modified, for example, by graft polymerization of another polymer onto the polyphenylene oxide backbone as disclosed and claimed in the copending application of Bostick et al., Ser. No. 673,022, filed Oct. 5, 1967 now U.S. Pat. No. 3,522,326, and assigned to the same assignee as the present invention or if the polyphenylene oxide has been incorporated in a block or random copolymer, for example, as disclosed in the above-identified Hay patents, wherein two or more phenols are cooxidatively coupled or the coupling reaction is started using one phenol and one or more different phenols are introduced during the reaction.

Of all of the polyphenylene oxides I have investigated only the poly(2,6-dimethyl-1,4-phenylene oxide) has this property of dissolving and later precipitating from these three specific solvents. This unique property, therefore, permits the separation of this polymer from its blends with all other polymers, including other polyphenylene oxides, that are soluble in these three solvents. Since these three solvents have very strong solvent properties, they will dissolve almost all thermoplastic polymers and their blends with poly(2,6-dimethyl-1,4-phenylene oxide). Therefore, this process can be used to readily separate and recover each of the components in the blend.

Another method which can be used to perform the same separation is to expose the polymer blend to the vapors of one or more of these three solvents since even the vapors are capable of rendering poly(2,6-dimethyl-1,4-phenylene oxide) insoluble in the liquid solvent. Sufficient time, of course, must be allowed to permit a sufficient amount of the vapors to permeate the entire mass of the blend. Although heating will aid permeation, after such treatment, the blend should be allowed to cool, preferably to room temperature, while in contact with the vapor of the solvent to permit the solvent-polymer complex to form. Thereafter, the blend is placed in contact with the liquid solvent which extracts all of the other polymer which has been blended with the poly(2,6-dimethyl-1,4-phenylene oxide).

By either method, one obtains a solution containing the poly(2,6-dimethyl-1,4-phenylene oxide) as a precipitate with the balance of the polymer in the blend being dissolved in the solvent. The precipitate is thereafter removed by conventional techniques, for example, filtration, centrifugation, decantation, etc., and preferably washed with an additional amount of one of these solvents to remove any trace of the other polymers in the blend. The poly(2,6-dimethyl-1,4-phenylene oxide) so recovered can be readily reused either to form a new blend or, used per se, as a molding compound. If desired, the solvent can be evaporated to recover the other components of the blend.

The fact that the poly(2,6-dimethyl-1,4-phenylene oxide) has been rendered insoluble in these three solvents does not in any way effect the useful properties of the polymer. For example, it is still soluble in any other solvent in which it initially was soluble. The precipitated polymer is associated with and appears to form a crystalline complex with the solvent. Subjecting the precipitated polymer to vacuum drying or air drying either at ambient temperature or at elevated temperature removes the solvent and reconverts the poly(2,6-dimethyl-1,4-phenylene oxide) back to a state wherein it is again readily soluble in these three solvents but, will again precipitate on standing. Removal of the solvent can also be obtained by washing the precipitated poly(2,6-dimethyl-1,4-phenylene oxide) with a liquid which is a nonsolvent for the polymer but it is a solvent for the dichloromethane, dibromomethane or bromochloromethane which has been used to precipitate the polymer, for example, an alkanol or dialkyl ether. The precipitation of this polymer is a reversible property. Heating the mixture of the precipitated polymer and any one of these three solvents will cause the polymer to redissolve. However, on cooling, the polymer will precipitate again on standing. It is apparent that this phenomenon of dissolving and then precipitating from these three solvents is readily reversible.

The time required for the poly(2,6-dimethyl-1,4-phenylene oxide) to precipitate from the solution or to become insoluble by exposure to the vapor of these solvents is dependent on the solvent used, the molecular weight of the poly(2,6-dimethyl-1,4-phenylene oxide), the temperature of the solution and, in the case where the polymer is dissolved in the solvents, the concentration of the dissolved polymer. Dichloromethane will cause the poly(2,6-dimethyl-1,4-phenylene oxide) to precipitate more rapidly than bromochloromethane which in turn will cause a quicker precipitation of the polymer than dibromomethane. This same order of the solvents exists when the vapor techniques is used. The higher the number average molecular weight of this poly(2,6-dimethyl-1,4-phenylene oxide) the sooner the polymer will precipitate. However, the precipitated polymer which first forms does not significantly differ in number average molecular weight from that of the starting polyphenylene oxide or from the number average molecular weight of the polyphenylene oxide which precipitates later. Apparently little if any, fractionation occurs. The more concentrated the solution, the sooner the poly(2,6-dimethyl-1,4-phenylene oxide) will precipitate. As mentioned above, heating causes decomposition of the complex formed between the poly(2,6-dimethyl-1,4-phenylene oxide) and the solvent. Therefore, lower temperatures aids precipitation. Ambient room temperature is a convenient temperature to utilize when insolubilizing the poly(2,6-dimethyl-1,4-phenylene oxide), since it requires neither heating nor cooling equipment. However, temperatures down to the freezing point of the solution can be used and temperatures up to about 70° C., are not too high to prevent the solvent-polymer complex from forming and causing at least some of the polymer to precipitate from a concentrated solution of a high molecular weight polymer, i.e., one with an intrinsic viscosity of at least 0.3 measured in chloroform at 25° C.

If the polymer blend contains pigments, dyes, fillers, etc., or another polymer which are insoluble in these three solvents, they can be separated from the blend in several ways. One way involves dissolving the blend in a solvent, for example, benzene or toluene, from which poly(2,6-dimethyl-1,4-phenylene oxide) does not precipitate, filtering off the insolubles, and either evaporating the solvent or precipitating the blend with a nonsolvent, e.g., methanol. Another way involves dissolving the blend in one of the above-mentioned three halomethane solvents and while keeping the solution hot, filtering to remove the insoluble material, permitting the solution to cool, for example, to room temperature, and thereafter allowing the solution to stand until the poly(2,6-dimethyl-1,4-phenylene oxide) precipitates from the solution. If the solvent vapor technique is used for insolubilization of the polyphenylene oxide, any material initially present in the blend which is insoluble in the solvent, can be separated from the insoluble polyphenylene oxide in a separate dissolution step. It is also obvious that the other polymer or polymers in the initial blend which are soluble in the three solvents can be recovered after removal of the precipitated polyphenylene oxide by evaporation of the solvent or by precipitation by adding a nonsolvent.

In this way, I can conveniently recover the various ingredients initially present in the blend. This technique is therefore useful in recovering not only scrap material produced in molding operations, such as, flash, sprues, defective molded objects, out-of-specification material, etc., but also is therefore a valuable technique for reducing costs. I have also noted that color bodies which may be present in the polymer tend to concentrate in the solution and, therefore, can be removed from the polymer, especially by several cycles using fresh solvent each time to dissolve the polymer.

In making a graft copolymer on a poly(2,6-dimethyl-1,4-phenylene oxide) backbone not only is the desired graft copolymer present, but some ungrafted poly(2,6-dimethyl-1,4-phenylene oxide) may still remain due to the fact that grafting did not occur on all of the polymer molecules, or the amount of grafting was insufficient on some polymer molecules to sufficiently modify their solvent properties so that they will dissolve in these three solvents and thereafter precipitate. Those polymer molecules which have been sufficiently grafted so that they will not precipitate from these three solvents can therefore be separated from the other molecules of the polymer which are either not grafted or insufficiently grafted. These and other modifications of my invention will be readily apparent to those skilled in the art.

In order that those skilled in the art may more readily understand my invention, the following examples are given by way of illustration and not by way of limitation. In all of the examples, parts are by weight, temperatures are in degrees Centigrade and intrinsic viscosities are measured in chloroform at 25° unless otherwise stated.

EXAMPLE 1

A series of solutions of various concentrations of poly(2,6-dimethyl-1,4-phenylene oxide) were prepared in dichloromethane, also known as methylene chloride and sealed in glass tubes tubes. These solutions were heated and allowed to cool slowly at a rate of 0.4°/min. with agitation in a controlled temperature bath. The temperature at which the solution became hazy indicating incipient precipitation of the polymer was noted. This data is shown in Table 1, under the column heading $T_p$. All solutions were then cooled to 26° C., and held at this temperature for 2 hours and the solutions reheated using a heating rate of 0.2°/min., until reaching a temperature where complete solution is obtained. These values are listed in Table 1, under the column $T_m$.

The large discrepancy between the two values obtained for each solution indicated that considerable supercooling had occurred during cooling and that either a slower rate of cooling or cooling and holding at a given temperature for a longer period of time, would have given higher values of $T_p$. The temperature at which the solutions became clear was redetermined by raising the temperature in steps of 0.2° and holding for at least several hours before raising the temperature. These values are shown in Table 1, under the column heading $T_{me}$. These values represent the approximate equilibrium temperature between dissolved and undissolved polymer for each concentration, or stated in another way, the maximum temperature at which precipitation of the polymer would occur from each solution to produce a less concentrated solution of the polymer if each of the solutions were held at that temperature.

TABLE 1

| Solution | Percent Polymer | $T_p$ | $T_m$ | $T_{me}$ |
| --- | --- | --- | --- | --- |
| 1 | 0.42 | (a) | 48.0 | 53.75 |
| 2 | 0.80 | 26.0 | 48.2 | 54.8 |
| 3 | 1.53 | 30.5 | 48.8 | 55.75 |
| 4 | 3.18 | 32.0 | 51.0 | 57.75 |
| 5 | 4.60 | 35.3 | 53.0 | 58.75 |
| 6 | 7.71 | 39.3 | 56.25 | 60.25 |
| 7 | 13.77 | — | — | 66.25 |
| 8 | 18.77 | — | — | 69.6 |
| 9 | 23.62 | — | — | 73.5 |

(a) Solution became hazy after 35 minutes at 26°.

The data in Table 1, shows that the rate of cooling will determine the temperature at which precipitation will occur and that more concentrated solutions will start to precipitate at a higher temperature than solutions of a lower concentration. When starting with a more concentrated solution, cooling to an intermediate temperature will precipitate some, but not all of the polymer. To precipitate essentially all of the polymer, one must cool to at least 50°.

For example, a solution containing 23.65 percent of the polyphenylene oxide will precipitate some polymer at a temperature of 73.5°. When cooled to a temperature of 69.6°, the solution will precipitate sufficient polymer that the polymer solution will now be in the order of 18.7 percent, while cooling to 54.8° is required, to reduce the final concentration of the polymer in solution to less than 1 percent. Cooling below 50°, would cause essentially all of the polymer to precipitate. It is obvious that holding the solutions at some elevated temperature where precipitation occurs offers no advantage to merely letting the solution cool to ambient room temperature at which point essentially all of the dissolved poly(2,6-dimethyl-1,4-phenylene oxide) will have precipitated.

The above data was obtained on a polymer having an intrinsic viscosity of 0.5, which corresponds to a number average molecular weight ($\overline{M}_n$) of 18,500 g./mole determined by osmometry and a weight average molecular weight ($\overline{M}_w$) of 37,000 g./mole determined by light scattering. As Example 2 will illustrate, the time to precipitate at a given temperature is dependent upon the molecular weight as indicated by intrinsic viscosity, and therefore no set rule covering a wide range of molecular weights of this polymer can be set for the time and temperature to cause precipitation. However, the above procedure permits this relationship to be readily determined for any particular molecular weight of a poly(2,6-dimethyl-1,4-phenylene oxide) which has been used in making the polymer blend.

EXAMPLE 2

In this example, two solutions were prepared containing 20 and 1 percent, respectively, of the same polymer as used in Example 1, in dichloromethane. On standing at room temperature, incipient precipitation occurred in the 20 percent solution in less than 2 minutes, whereas, it took 1 hour for the 1 percent solution. Precipitated polymer recovered by vacuum filtration and air dried at room temperature by pulling air through the filter for 10 to 20 minutes, was still insoluble in dichloromethane, but soluble in chloroform or benzene. In two separate tests, NMR analysis showed that the precipitated polymer contained one molecule of dichloromethane for each two to five repeating units of the polymer. After air drying for 2 hours at room temperature, chlorine analysis indicated sufficient evaporation of the solvent that there was now only one molecule of solvent per 900 monomer repeating units of the polymer. At this point, the polymer was again soluble in dichloromethane. This drying procedure was accelerated by drying the polymer at a reduced pressure and by heating. Furthermore, when the freshly precipitated polymer was washed with methanol, the polymer again is rendered immediately soluble in dichloromethane.

When 1 percent solutions in dichloromethane of poly(2,6-dimethyl-1,4-phenylene oxide) having intrinsic viscosities of 1.0 ($\overline{M}_n$ about 50,000) and 0.08 ($\overline{M}_n$ about 1,500), respectively, were compared with the polymer having an intrinsic viscosity of 0.5, the times for onset of precipitation of the polymer at ambient temperature from solution for the polymer having the highest intrinsic viscosity was shorter than for the polymer having the intermediate intrinsic viscosity, which in turn, was much shorter than for the polymer having the lowest intrinsic viscosity.

Likewise, the times for incipient precipitation at ambient temperature from 1 percent solutions of the polymer having intrinsic viscosity of 0.5 in dichloromethane, chlorobromomethane or dibromomethane were in the order of 1 hour, 1 day and 1 week, respectively, thus illustrating the marked advantage to be gained by using dichloromethane in place of the other two solvents.

In another test, the above polymer was exposed in a closed container at room temperature to the vapors of the three solvents and periodically tested for solubility in the liquid solvents. It required 3 days exposure to the vapors of dichloromethane and correspondingly longer times for the other two solvents, to cause the poly(2,6-dimethyl-1,4-phenylene oxide) to become completely insoluble in the liquid solvents.

EXAMPLE 3

A 1 percent solution of the poly(2,6-dimethyl-1,4-phenylene oxide) having an intrinsic viscosity of 0.5 in dichloromethane was divided into several portions and the effects of various modifications and additives were studied. Purification of the solvent, exclusion of light, the use of a nitrogen atmosphere or the addition of 1 percent aqueous concentrated hydrochloric acid had no effect on the time for incipient precipitation. The addition of 1 percent methanol, 1 percent diethyl amine, 1 percent formaldehyde or use of acetate capped poly(2,6-dimethyl-1,4-phenylene oxide) (reaction of the terminal hydroxyl groups with acetic anhydride) increased the time and addition of 1 percent phenol decreased the time for incipient precipitation of the polymer.

EXAMPLE 4

A 2 percent solution of a blend containing 50 percent polystyrene and 50 percent poly(2,6-dimethyl-1,4-phenylene oxide) in dichloromethane was prepared and allowed to stand with agitation while cooling in an ice bath. After 30 minutes, the ice bath was removed and the solution allowed to warm to room temperature which required approximately 30 minutes. The solution was filtered to recover the poly(2,6-dimethyl-1,4-phenylene oxide) and the filtrate was poured into methanol to recover the polystyrene. The precipitate was washed several times with dichloromethane to remove any adherent solution which would contaminate the polyphenylene oxide with styrene. Each of the components of the initial blend were recovered and identified by standard analytical techniques.

In another test, the polystyrene in the blend was high-impact polystyrene which has a small amount of a rubbery phase which is insoluble in most solvents. To remove this phase, the polymer blend was first dissolved in benzene and centrifuged to remove the insoluble phase. The balance of the poly(2,6-dimethyl-1,4-phenylene oxide) and polystyrene which had dissolved was recovered by precipitation with methanol. Treatment of this precipitate as described above, resulted in separation of the poly(2,6-dimethyl-1,4-phenylene oxide) from the polystyrene.

EXAMPLE 5

In an attempt to make a copolymer in which dimethylsiloxane was polymerized in the presence of activated poly(2,6-dimethyl-1,4-phenylene oxide), a blend of the polyphenylene oxide and the dimethylsiloxane, actually resulted. This was shown when a 2.5 percent solution in dichloromethane resulted in a precipitate on standing which was identified as poly(2,6-dimethyl-1,4-phenylene oxide) with the dimethylsiloxane remaining dissolved in dichloromethane from which it was recovered and identified.

EXAMPLE 6

In an attempt to make a block copolymer containing blocks of poly(2,6-dimethyl-1,4-phenylene oxide) and blocks of poly(2,6-diphenyl-1,4-phenylene oxide), a blend of the two polymers resulted as was shown when an approximately 3 percent solution of this polymer in dichloromethane on standing resulted in the formation of a precipitate which was identified as a poly(2,6-dimethyl-1,4-phenylene oxide), leaving the poly(2,6-diphenyl-1,4-phenylene oxide) in solution, from which it was recovered and identified.

The above examples have illustrated how my process may be used to readily separate poly(2,6-dimethyl-1,4-phenylene oxide) with any other polymer, which is soluble in the above-described three solvents, into the separate components of the blend. Likewise, it is useful in separating poly(2,6-dimethyl-1,4-phenylene oxide) homopolymer from graft copolymers, wherein grafts have been grown on the polyphenylene oxide backbone. It is also a useful technique to detect whether or not a graft polymerization reaction actually has been effected. These and other variations and modifications of the present invention will be readily discernable to those skilled in the art and are within the full intended scope of this invention as defined by the appended claims.

What I claim as new and desire to secure by Letters Patent in the United States is:

1. The process of separating poly(2,6-dimethyl-1,4-phenylene oxide) from a blend of said polymer with at least one polymer that is soluble in a solvent selected from the group consisting of dichloromethane, dibromomethane, bromochloromethane and mixtures thereof, which comprises treating said blend with said solvent for a time sufficient to render said poly(phenylene oxide) insoluble in said solvent and separating said insoluble polymer from a solution of the balance of the polymer blend in said solvent.

2. The process of claim 1 wherein the solvent is dichloromethane.

3. The process of claim 1 wherein the polymer blend is dissolved in said solvent and said poly(phenylene oxide) is separated after it has precipitated from the solution.

4. The process of claim 3 wherein the solvent is dichloromethane.

5. The process of claim 1 wherein the polymer blend is exposed to the vapors of said solvent for a time sufficient to render said poly(phenylene oxide) insoluble in the solvent and thereafter contacting the polymer blend with the liquid solvent leaving said poly)phenylene oxide) undissolved and the balance of the blend dissolved and thereafter separating the two phases.

6. The process of claim 5 wherein said solvent is dichloromethane.

* * * * *